United States Patent [19]
Wickham et al.

[11] 3,724,563
[45] Apr. 3, 1973

[54] COLLET CHUCK OPERATED BY THROTTLE CONTROL FOR ROTARY POWER TOOL

[75] Inventors: John L. Wickham, Glen Arm; Lee W. Ramstrom, Joppa; Albert G. Wordsworth; Robert A. Meloni, both of Baltimore, all of Md.

[73] Assignee: The Black and Decker Manufacturing Company, Towson, Md.

[22] Filed: Mar. 8, 1971

[21] Appl. No.: 121,731

[52] U.S. Cl. ................... 173/163, 279/1 B, 279/4
[51] Int. Cl. .............................................. B23b 31/20
[58] Field of Search ...415/123, 503; 32/27; 128/303, 128/305; 279/1 B, 4; 173/12, 163

[56] References Cited

UNITED STATES PATENTS 3,128,079  4/1964  De Groff ........................... 415/123
3,530,586  9/1970  Weickgenannt ...................... 32/26
2,138,342  11/1938  Dickenson .......................... 279/4

FOREIGN PATENTS OR APPLICATIONS 675,825  7/1952  Great Britain ...................... 32/26

Primary Examiner—Ernest R. Purser
Attorney—Leonard Bloom, Joseph R. Slotnik and Edward D. Murphy

[57] ABSTRACT

A portable rotary power tool including a housing having a vane-type pneumatic motor disposed therein. The motor is coupled to an output shaft rotatably supported within the housing. A collet is keyed within the shaft and is adapted to releaseably grip a tool bit. A throttle valve controls operation of the motor and is operated by a pivoted lever mounted on the housing. When the lever is moved in a direction opposite to that required for operation of the motor, the collet is positively released from the bit.

16 Claims, 5 Drawing Figures

PATENTED APR 3 1973 3,724,563
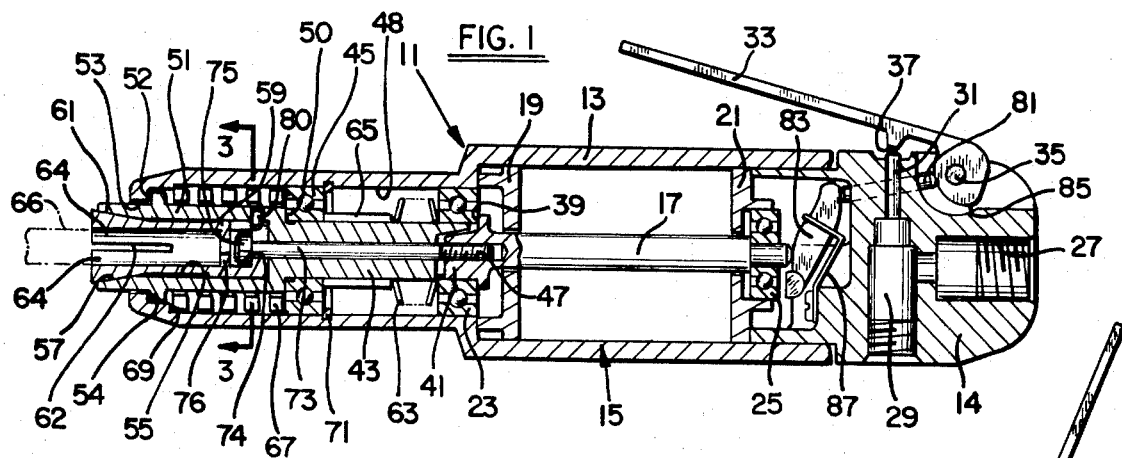
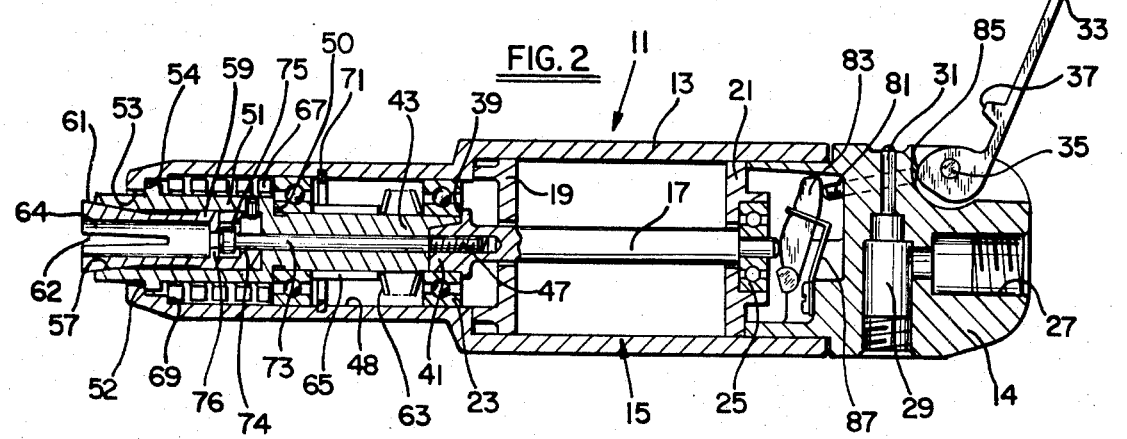
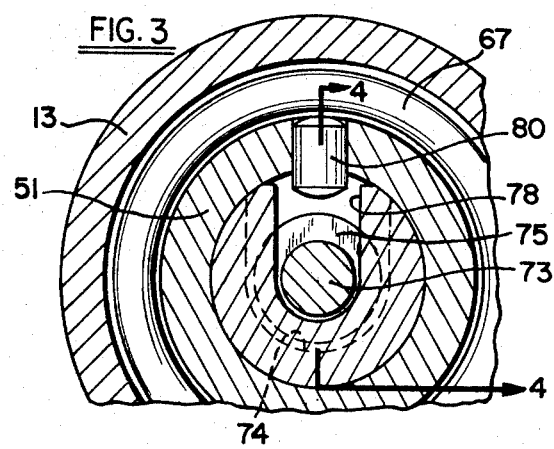
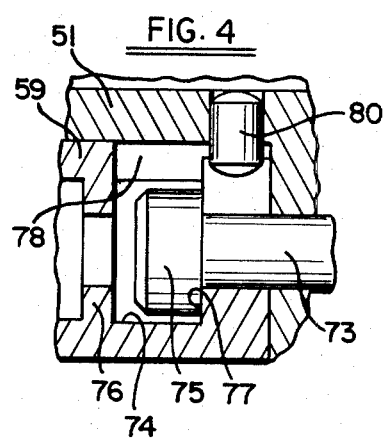
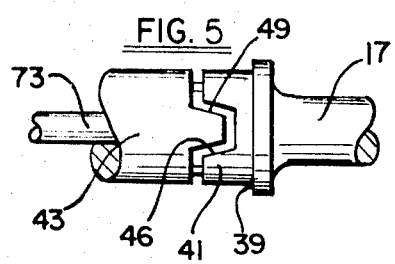
INVENTORS
JOHN L. WICKHAM
LEE W. RAMSTROM
ALBERT G. WORDSWORTH
ROBERT A. MELONI
BY Joseph R. Slotnik

COLLET CHUCK OPERATED BY THROTTLE CONTROL FOR ROTARY POWER TOOL

SUMMARY OF THE INVENTION

The present invention is directed to a novel collet construction and actuating means therefor for use in a rotary, motor driven tool. The construction embodies a feature whereby a bit held by the collet is positively released therefrom. The construction develops relatively high holding forces on a bit and is virtually independent of wear in the parts. The holding forces developed are substantially independent of the motor so as not to hinder motor or tool performance. The collet of this invention is positive in operation, requires no tools to insert or remove a bit, is compact and embodies a minimum of independent separate parts, is relatively inexpensive and is safe, reliable and efficient in performance.

Main objects of the present invention, therefore, are to provide, for use with a rotary, motor driven tool, a novel collet construction which is positive and entirely manual in operation, and which develops relatively high and accurate holding forces on a bit.

Further important objects of the present invention are to provide a collet construction of the above character which cannot be operated to release a bit when the tool is in operation, which maintains its holding power and accuracy regardless of wear in its parts, and wherein the relatively high forces developed therein are substantially independent of and do not hinder or detract from the motor or tool performance.

Additional important objects of the present invention are to provide a novel collet construction of the above character which is relatively inexpensive to manufacture, rugged in construction, and reliable in use.

Other important objects will become more apparent from a consideration of the detailed description and claims to follow taken in conjunction with the drawings annexed hereto.

BRIEF DESCRIPTION OF THE DRAWINGS

FIG. 1 is a longitudinal sectional view of a portable pneumatic rotary tool embodying a collet of the present invention, and showing the position of the parts with the collect grippingly engaged with a bit and the motor off;

FIG. 2 is a view similar to FIG. 1 showing the position of the parts with the collet released from the bit;

FIG. 3 is an enlarged sectional view of the construction of FIG. 1 taken along the line 3—3 thereof;

FIG. 4 is a sectional view of the construction of FIG. 3 taken along the line 4—4 thereof; and FIG. 5 is an enlarged view of a portion of the construction of FIG. 1.

BROAD STATEMENT OF THE INVENTION

Broadly described, the present invention relates to a portable tool including a housing having a rotary, fluid-operated motor disposed therein, throttle valve means within said housing controlling flow of pressurized fluid to said motor, lever means pivoted on said housing and movable in a first direction to open said throttle valve means, said motor including a rotor spindle rotatably supported in said housing, a shaft coupled to said rotor spindle for rotation therewith, a collet within said shaft adapted to releaseably grip a bit, the improvement which comprises cooperable cam surface means on said collet and said shaft, means normally biasing said collet in one longitudinal direction, whereby cooperation between said cam surfaces effects radial contraction of said collet about a bit, said lever being movable in a second direction opposite to said first direction and operatively engageable with said rotor spindle, whereby to shift said rotor spindle in an axial direction, means interconnecting said rotor spindle and said collet, whereby said axial movement of said rotor spindle positively moves said collet against said biasing means, whereby to release said collet from said bit.

In another aspect, the present invention relates to a fluid operated device comprising a housing, a motor within said housing and including a rotor spindle rotatably supported within said housing, a shaft rotatably supported in said housing and coupled for conjoint rotation with said rotor spindle, said shaft having a generally hollow cylindrical-shaped outer end, a collet within said shaft outer end and operable to grip a tool bit, said shaft and said collet having complementary, engageable conical surfaces, whereby movement of said collet into said shaft causes a portion of said collet adjacent said conical surface to be radially contracted, means independent of said shaft connecting said rotor spindle and said collet for conjoint longitudinal movement, means normally biasing said rotor spindle and said shaft in opposite axial directions whereby to bias said collet into said shaft, manually operable means engageable with said rotor spindle whereby to move said rotor spindle in an axial direction against said biasing means, whereby to move said collet out of said shaft and release said collet from said bit.

In still another aspect, the present invention relates to a pressure fluid operated rotary device comprising a housing having a rotary vane-type motor disposed therein, said motor including a rotor spindle supported for rotation and limited axial movement within said housing, a shaft coupled for conjoint rotation with said rotor spindle and supported for limited axial movement relative thereto, a collet in said shaft and interconnected with said rotor spindle for conjoint axial movement therewith, cooperable means on said shaft and said collet operable to hold said collet in engagement with a bit when said collet is in a first position within said shaft, resilient means normally holding said rotor spindle and shaft in one relative axial position and said collet in said one position, manually operable means operatively engageable with said rotor spindle for moving said rotor spindle axially relative to said shaft and against the action of said biasing means, whereby to move said collet in a direction away from said first position, whereby to release said collet from said bit.

In yet another aspect, the present invention relates to a portable, hand held, power tool comprising a housing, a powered rotary motor in said housing and having an output rotary spindle, a collet coupled to said spindle for conjoint rotation and axial movement therewith and having radially deflectable fingers for gripping a bit, a shaft sleeved over and keyed to said collet, cooperable cam surfaces on said shaft and said collet operable to deflect said fingers into gripping engagement with a bit when said collet is moved in one axial direction relative to said shaft, said collet fingers being radially movable out of gripping engagement with said bit when said collet is moved in another axial direction relative to said shaft, axially spaced bearing means slip fitted in said housing, and supporting and axially engaging said shaft and said rotor, resilient means biasing said bearing means axially apart and said collet in said one axial direction relative to said shaft, and manually operable means on said housing and operable to move said collet in said another axial direction relative to said shaft.

In yet another aspect, the present invention relates to a portable, hand held, pneumatic tool comprising a housing having a generally cylindrical portion which is hand gripped by an operator during normal tool use, a rotary vane-type motor in said housing, a throttle valve in said housing and controlling the flow of pressurized fluid to said motor, an operating lever pivoted on said housing adjacent said cylindrical portion and movable toward said housing by said operator's hand during normal tool use, whereby to open said throttle valve and operate said motor, a shaft rotatably supported in said housing and driven by said motor, a collet carried in said shaft and operable to clampingly engaged with a bit to couple said bit to said shaft, means operably interconnecting said collet and said lever and operable to positively release said collet from clamping engagement with said bit by pivotal movement of said operating lever away from said housing cylindrical portion.

In yet another aspect, the present invention relates to a portable, hand held, power tool comprising a housing having a generally cylindrical portion which is hand gripped by an operator during normal tool use, a rotary motor in said housing, motor control means in said housing and controlling operation of said motor, an operating lever pivoted on said housing adjacent said cylindrical portion and movable toward said housing by said operator's hand during normal tool use, whereby to actuate said control means and operate said motor, a shaft rotatably supported in said housing and driven by said motor, a collet carried by said shaft and engageable with a bit to couple said bit to said shaft, means normally biasing said collet into gripping engagement with said bit, means operable by said operating lever and positively moving said collet against said biasing means to release said bit by pivotal movement of said operating lever away from said housing cylindrical portion.

In yet another aspect, the present invention relates to a portable, hand held, power tool comprising a housing, means defining a portion which is hand gripped by an operator during normal tool use, a rotary motor in said housing, motor control means in said housing and controlling operation of said motor, an operating member movably mounted on said housing adjacent said hand gripping portion and manually movable in one direction during normal tool use, whereby to actuate said control means and operate said motor, a shaft rotatably supported in said housing and driven by said motor, a collet carried by said shaft and engageable with the bit to couple said bit to said shaft, means normally biasing said collet into gripping engagement with said bit, means operable by said operating member and positively moving said collet against said biasing means to release said bit by movement of said operating member in another and different direction.

DETAILED DESCRIPTION

Referring now more specifically to the drawings, a portable, pneumatic, rotary tool embodying the present invention is illustrated generally at 11 in FIG. 1 and is seen to include a stepped cylindrical housing 13 having a valve body 14 secured thereto. A pneumatic motor 15 is supported within the housing and includes a vane-type rotor spindle 17 extending through end plates 19, 21 and rotatably supported, fore and aft, by bearings 23, 25 carried by the housing 13 and the end plate 21, respectively.

Pressurized air is admitted through an inlet port 27 in the valve body 14 and is controllably delivered to the motor 15 by way of a throttle valve 29. A slideable plunger 31 is movable downwardly, as seen in FIG. 1, to open the throttle valve 29 when an operating lever or handle 33 pivoted on the body 14 by a pin 35 is moved toward the housing 13. The handle 33 has a projection 37 engageable with the plunger 31. In normal use of the tool 11, the operator grasps the housing 13 with one hand and holds the operating handle 33 against the adjacent portion of the housing 13, thereby opening the throttle valve 29 and operating the motor 15.

The forward end of the rotor spindle 17 has a radial shoulder 39 engaging the inner race of the bearing 23, and a hub 41 extending into the bearing 23. A hollow shaft 43 has its rear end rotatably supported within the bearing 23 and has axially extending fingers 49 which interfit with axially extending fingers 46 on the hub 41, so that the rotor spindle 17 and shaft 51 rotate together while allowing limited axial movement of said rotor spindle 17 relative to said shaft 43 for a purpose to be described.

As shown in FIGS. 1 and 2, the shaft 43 has an enlarged, hollow generally cylindrical forward portion 51 extending through and beyond an opening 53 in the front of the housing 13. A radial shoulder 50 separates the forward shaft portion 51 from the other part of the shaft 43 and has a bearing 45 positioned thereagainst. The bearing 45 is slip fitted in a bore 48 in the housing 13 and rotatably supports the shaft 43 at an intermediate area.

The forward shaft portion 51 has a radial flange 52 disposed behind and normally spaced from a radial lip 54 on the housing 13, and is formed with a cylindrical bore 55 terminating in a conical tapered cam surface 57 at the extreme front end thereof. A collet 59 is slideably received in the bore 55 and has a conically tapered surface 61 disposed adjacent and engageable with the tapered shaft surface 57. The collet is slotted, as shown at 62, forming radially deflectable fingers 64. The taper angles defined by the shaft and collet surfaces 57, 61 are relatively shallow, the taper on the collet surface 61 being sharper than that on the shaft surface 57 so that when the collet 59 is drawn rearwardly into the shaft 51, or toward the right as seen in FIGS. 1 and 2, camming engagement between the conical surfaces 57, 61 deflects the fingers 64 radially inwardly into gripping engagement with a bit 66. Conversely, when the collet 59 is moved outwardly of the shaft 51, or toward the left as seen in FIGS. 1 and 2, release of the collet surface 61 from the shaft surface 57 allows the fingers 64 to expand radially to thereby release the bit 66.

The collet 59 is normally biased rearwardly into the shaft 51 to hold the collet surface 61 against the shaft surface 57, as shown in FIG. 1, under the biasing force of belleville washers 63. As shown, the washers 63 bear against the inner race of the bearing 23 which, in turn, bears against shoulder 39 on the rotor spindle 17, and against a sleeve 65 engaged with the inner race of the bearing 45 which, in turn, engages shoulder 50 on shaft 43. A screw 73 extends loosely through the shaft 43 and has an enlarged head 75 disposed in a cavity 74 in the collet 59, and its other end threaded into an opening 47 in the rotor spindle 17. An enlarged slot 78 in the collet 59 allows radial insertion of the screw head 75 into the collet cavity 74. A pin 80 carried by the shaft portion 51 extends radially into the slot 78 and keys the shaft 43 to the collet 59. A compression spring 67 is caged between a shoulder 69 in the housing 13 and the outer race of the bearing 45 to normally hold the latter against a retaining ring 71.

The screw head 75 is axially trapped between a bottom surface 77 and a radial lip 76 in the collet 59 and which define the cavity 74. The rotor spindle 17 is adapted to be moved in a left hand direction, as seen in FIGS. 1 and 2, by cooperative engagement between a slide pin 81, and a pivoted lever 83 which bears against one end of the rotor spindle 17. The actuating handle 33 has a cam surface 85 which, when the handle is pivoted away from the housing 13 to the position shown in FIG. 2, slides the pin 81 and pivots the lever 83 in a counterclockwise direction. This causes the rotor spindle 17 to move axially toward the left and, through the screw 73, the screwhead 75, and lip 76, moves the collet 59 also toward the left. Once the collet surface 61 is free of the shaft surface 57, the collet fingers 64 expand radially and release the bit 66 held thereby.

It will be appreciated that this left-hand directional movement of the rotor spindle 17 moves the bearing 23 toward the left against the biasing force of the belleville washers 63. The bearing 23 is free to so move since it is slip fitted in the housing bore 48. Only a limited amount of axial movement of the shaft 43 and bearing 45 occurs since this is limited by engagement between the flange 52 on the shaft portion 51 and shoulder 54 on the housing 13. Thus, after the shaft flange 52 engages the housing shoulder 54, further movement of rotor spindle 17 axially toward the left moves the collet 59 relative to the shaft 43 and releases the collet surface 61 from the shaft surface 57.

When the actuating handle 33 is moved back into the position shown in FIG. 1, the belleville washers 63 move the rotor spindle 17 back toward the right and, through the screw 73, moves the collet 59 back into the position shown in FIG. 1, The spring 67 moves the bearing 45 back against the retainer 71 and spaces the flange 52 from the shoulder 54. A spring 87 normally holds the lever 83 against the pin 81 and out of engagement with the rotor spindle 17.

It will be appreciated that the holding forces generated by the belleville washers 63 on the collet 59, pose no undesirable thrust loading which might interfere with or reduce the efficiency of the motor 15 or the tool 11. Thus, the belleville washers 63 act against one side of only the inner race of both bearing 23, 45, and the reaction to these forces are developed by the shoulders 39, 50 on the rotor spindle 17 and shaft 43 on the other side of the inner races of bearings 23, 45, respectively. The outer races of each bearing 23, 45 has a slip fit in the housing bore 48. When the parts are moved to release the collet 59 from the bit 66, the bearing 23 slides axially toward the left within the housing 13, as does the bearing 45 to a lessor extent, and substantially all axial forces on the bearings 23, 45 act only on their inner races. The force of the spring 57 on the outer race of bearing 45 is relatively light and is only enough to normally hold the spindle flange 52 away from the housing shoulder 54, and is only a factor when the bearing 45 is moved away from the retainer 71 during release of the collet 59 from bit 66.

Important features of the construction of the present invention reside in the fact that the release for the collet 59 acts in a positive manner, that is, the collet 59 is positively forced out of the shaft 51 to release the fingers 64 for radial expansion so that a bit 66 may easily be inserted and/or removed from the collet 59. Furthermore, it will be appreciated that to release the collet 59, the actuating handle 33 is pivoted in a direction opposite to that required for tool and motor actuation. The valve stem 31 is recessed into housing 13 so that when lever 33 is in the position shown in FIG. 2, the tool 11 cannot be accidentally turned on. This is a safety feature for the tool 11 in that it cannot be operated when the operator is removing a bit from or replacing a bit in the collet 59. ALso, release of the collet 59 does not require that the tool 11 be connected to a power source, and is entirely manual in operation requiring no tools whatsoever.

Furthermore, by providing the relatively shallow angles on the tapered surfaces 57, 61, relatively high holding forces can be developed by the fingers 64 on the bit 66. Also, the shallow angles facilitate accuracy and long life which is substantially unaffected by wear thereof. Still further, the construction of the present invention, as when used in a pneumatic device as illustrated, embodies a compact, light-weight, and inexpensive design in that the collet actuating mechanism embodies a minimum of parts, occupies a minimum of space, and is convenient and easy to use. Thus, by utilizing the throttle lever 33 to release the collet 59, an additional lever or the like is avoided. By shifting the rotor spindle 17 axially to release the collet, a small dimensional motor 15 is made possible (as distinguished from the size required if the rotor spindle 17 were hollow, for example, to accommodate collet release mechanism). The size of the motor 15 is important since it determines the diameter of the housing 13, and this is the area where the operator grips and holds the tool 11 during use.

While preferred embodiment has been illustrated and described above in detail, it will be appreciated that various additions, substitutions, modifications and omissions may be made thereto without departing from the spirit of the invention.

We claim:

1. A portable tool including a housing having a rotary, fluid-operated motor disposed therein, throttle valve means within said housing controlling flow of pressurized fluid to said motor, lever means pivoted on said housing and movable in a first direction to open said throttle valve means, said motor including a rotor spindle rotatably supported in said housing, a shaft coupled to said rotor spindle for rotation therewith, a collet within said shaft adapted to releaseably grip a bit, the improvement which comprises cooperable cam surface means on said collet and said shaft, means normally biasing said collet in one longitudinal direction, whereby cooperation between said cam surfaces effects radial contraction of said collet about a bit, said lever being movable in a second direction opposite to said first direction and operatively engageable with said rotor spindle, whereby to shift said rotor spindle in an axial direction, means interconnecting said rotor spindle and said collet, whereby said axial movement of said rotor spindle positively moves said collet against said biasing means, whereby to release said collet from said bit.

2. A tool as defined in claim 1 wherein said cam surface means includes conical tapered surfaces on said collet and shaft, said surface on said collet having a sharper angle than said surface on said shaft.

3. A tool as defined in claim 2 wherein said collet is longitudinally slotted at said conically tapered portion forming a plurality of radially flexible fingers.

4. A tool as defined in claim 1 wherein the force of said biasing means acts on said collet and shaft, said interconnecting means between said rotor spindle and said collet preventing said biasing means from imposing undesirable loads on said rotor spindle.

5. A tool as defined in claim 1 which includes cooperable abutment means between said shaft and said housing, said coupling between said rotor and said shaft allowing limited axial movement therebetween, whereby initial axial shifting of said rotor spindle moves said collet relative to said shaft and thereafter said rotor spindle, said shaft and said collet are moved together to engage said abutment means, said abutment means preventing further movement of said collet, shaft, and rotor spindle.

6. A tool as defined in claim 5 which includes means normally biasing said shaft in an axial direction to space said abutment means.

7. A fluid operated device comprising a housing, a motor supported within said housing and including a rotor spindle rotatably supported within said housing, a shaft rotatably supported in said housing and coupled for conjoint rotation with said rotor spindle, said shaft having a generally hollow cylindrical-shaped outer end, a collet within said shaft outer end and operable to grip a tool bit, said shaft and said collet having complimentary, engageable conical surfaces, whereby movement of said collet into said shaft causes a portion of said collet adjacent said conical surface to be radially contracted, means independent of said shaft connecting said rotor spindle and said collet for conjoint longitudinal movement, means normally biasing said rotor spindle and said shaft in opposite axial directions whereby to bias said collet into said shaft, manually operable means engageable with said rotor spindle whereby to move said rotor spindle in an axial direction against said biasing means, whereby to move said collet out of said shaft and release said collet from said bit.

8. A device as defined in claim 7 wherein said interconnecting means between said rotor spindle and said collet includes an elongated member extending loosely through said shaft.

9. A device as defined in claim 7 which includes means independent of the rotatable support for said rotor spindle limiting axial movement of said rotor spindle in both directions.

10. A device as defined in claim 7 which includes first and second longitudinally spaced bearings slideably supported in said housing and engaging shoulders on said shaft and rotor spindles, respectively, said biasing means operatively engaging said bearings.

11. A portable, hand-held, pneumatic tool comprising a housing having a generally cylindrical portion which is hand gripped by an operator during normal tool use, a rotary vane-type motor in said housing, a throttle valve in said housing and controlling the flow of pressurized fluid to said motor, an operating lever pivoted on said housing adjacent said cylindrical portion and movable toward said housing by said operator's hand during normal tool use, whereby to open said throttle valve and operate said motor, a shaft rotatably supported in said housing and driven by said motor, a collet carried by said shaft and operable to clampingly engage with a bit to couple said bit to said shaft, means operably interconnecting said collet and said lever and operable to positively release said collet from clamping engagement with said bit by pivotal movement of said operating lever away from said housing cylindrical portion.

12. A portable, hand-held, power tool comprising a housing having a generally cylindrical portion which is hand gripped by an operator during normal tool use, a rotary motor in said housing, motor control means in said housing and controlling operation of said motor, an operating lever pivoted on said housing adjacent said cylindrical portion and movable towards said housing by said operator's hand during normal tool use, whereby to actuate said control means and operate said motor, a shaft rotatably supported in said housing and driven by said motor, a collet carried by said shaft and engageable with a bit to couple said bit to said shaft, means normally biasing said collet into gripping engagement with said bit, means operable by said operating lever and positively moving said collet against said biasing means to release said bit by pivotal movement of said operating lever away from said housing cylindrical portion.

13. A device as defined in claim 12 wherein said rotary motor comprises a pneumatic vane-type motor, said control means comprises a throttle valve including a pin slideable on said housing, said operating lever including a projection engageable with said pin, said housing including means defining a recess surrounding said pin, whereby said pin is inaccessible for accidental manual operation when said lever is moved away from said cylindrical housing portion.

14. A portable, hand-held, power tool comprising a housing, means defining a portion which is hand gripped by an operator during normal tool use, a rotary motor in said housing, motor control means in said housing and controlling operation of said motor, an operating member movably mounted on said housing adjacent said hand gripped portion and manually movable in one direction during normal tool use, whereby to actuate said control means and operate said motor, a shaft rotatably supported in said housing and driven by said motor, a collet carried by said shaft and engageable with the bit to couple said bit to said shaft, means normally biasing said collet into gripping engagement with said bit, means operable by said operating member and positively moving said collet against said biasing means to release said bit by movement of said operating member in another and different direction.

15. A pressure fluid operated rotary device comprising a housing having a rotary vane-type motor disposed therein, said motor including a rotor spindle supported for rotation and limited axial movement within said housing, a shaft coupled for conjoint rotation with said rotor spindle and supported for limited axial movement relative thereto, a collet in said shaft and interconnected with said rotor spindle for conjoint axial movement therewith, cooperable means on said shaft and said collet operable to hold said collet in engagement with a bit when said collet is in a first position within said shaft, resilient means normally holding said rotor spindle and shaft in one relative axial position and said collet in one position, manually operable means operatively engageable with said rotor spindle for moving said rotor spindle axially relative to said shaft and against the action of said biasing means, whereby to move said collet in a direction away from said first position, whereby to release said collet from said bit.

16. A portable, hand held, power tool comprising a housing, a powered rotary motor in said housing and having an output rotary spindle, a collet coupled to said spindle for conjoint rotation and axial movement therewith and having radially deflectable fingers for gripping a bit, a shaft sleeved over and keyed to said collet, cooperable cam surfaces on said shaft and said collet operable to deflect said fingers into gripping engagement with a bit when said collet is moved in one axial direction relative to said shaft, said collet fingers being radially movable out of gripping engagement with said bit when said collet is moved in another axial direction relative to said shaft, axially spaced bearing means slip fitted in said housing, and supporting and axially engaging said shaft and said rotor, resilient means biasing said bearing means axially apart and said collet in said one axial direction relative to said shaft, and manually operable means on said housing and operable to move said collet in said another axial direction relative to said shaft.

* * * * *